June 25, 1929.  B. BROIDO  1,718,328
METHOD OF MAKING PIPE STRUCTURES
Filed April 25, 1923
 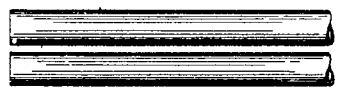
Fig. 1
Fig. 4
 
Fig. 2
Fig. 5
 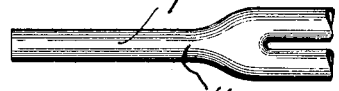
Fig. 3
Fig. 6
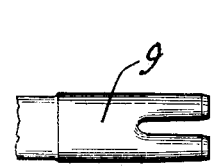 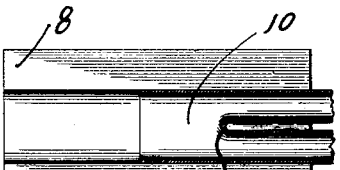
Fig. 7
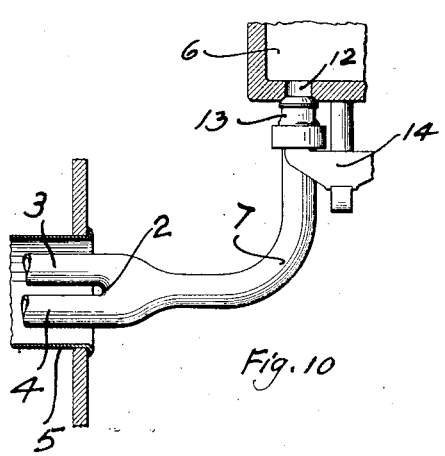
Fig. 8
Fig. 10
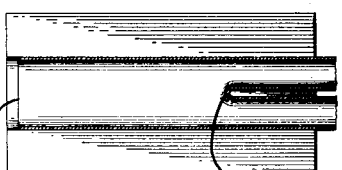
Fig. 9
Benjamin Broido  INVENTOR.
BY O. V. Thiele  HIS ATTORNEY.

Patented June 25, 1929.

1,718,328

UNITED STATES PATENT OFFICE.

BENJAMIN BROIDO, OF NEW YORK, N. Y., ASSIGNOR TO THE SUPERHEATER COMPANY, OF NEW YORK, N. Y.

METHOD OF MAKING PIPE STRUCTURES.

Application filed April 25, 1923. Serial No. 634,635.

The invention relates to the art of forging and particularly to the forging of two pipes into a unitary structure. It forms an extension of an invention disclosed in United States Patent 1,169,209 granted to True and McKee. The pipes, in connection with which I shall illustrate and describe my invention, are of utility in superheaters, although, as will be clear from the ensuing description, their use is not confined to these structures.

The invention has for its object to make the product, obtained by the method described in the above record. available in some cases where it would otherwise not be available and to do this without having recourse to any welding, safe-ending, etc.

My invention is illustrated in the accompanying single sheet of drawings. On this sheet Fig. 1 shows two pipes which are to be connected by my improved process: Fig. 2 represents these two pipes joined by my process: Fig. 3 shows the same two pipes after an additional step has been performed on them: Figs. 4, 5 and 6 show the three stages used in my process for passing from the form of Fig. 1, where the pipes are entirely separate, to that of Fig. 2: Figs. 7, 8 and 9 show the dies used in my process, the work being shown in them in the several stages, and Fig. 10 shows a portion of a superheater unit or element made according to my invention and illustrating how the product, made by my process, may be used.

In the United States Patent 1,169,209 referred to above there are fully described the method and the dies for connecting two pipes by what is there called an incomplete return bend. This method is by this time well known and has gone into extensive use. An extended description is therefore not required. It will suffice to state that to connect the two pipes, they are suitably heated. placed in suitable dies in the relative position they are to occupy, their adjacent walls are by a properly shaped male die split, spread out and simultaneously welded to each other. The resulting structure is clearly shown in Fig. 4 of the present application. It will be clearly understood that the structure shown in that figure is open at the left end 1.

In the specification of the patent the use contemplated for the structure just briefly described is as a return bend, and if it is to be used as such the end 1 will next be closed in any suitable manner. The structure shown in Fig. 4, however, has uses apart from that mentioned, and my invention relates to a use in which the end 1 is not closed but is to remain open so steam or other fluid may be delivered into it or taken out of it. Ordinarily it will be more convenient to shape this end 1 to a circular contour. This has been proposed and perhaps actually done in the past and I lay no claim to this phase.

It will generally be found that if the end 1 is reduced to a circular outline, the distance from 1 to the point 2 (see Fig. 4) is too short for practical purposes. If for example, the two pipes united are two branches of the superheater elements 3 and 4 (Fig. 10), which are located in a flue 5 and are to communicate with the superheater header 6, the distance from the point 2 to the header will be so great that the method and dies hitherto known are incapable of producing the necessary length.

It has been suggested that by making the dies and the stroke of the male die long enough, the necessary length of pipe 7 would result. It has been found in practice however that this is not feasible. The pipes must be heated to a welding heat and when it is attempted to carry the welding according to the old method beyond a certain length the pipes will fold and crumple up.

I now propose a method by which such a length can nevertheless be attained. Fig. 7 shows one-half of the female die employed in my process, the other half being symmetrical with it and not being shown in the figure. The male die 9 is shown in the position which it occupies at the end of its outward travel. It will be apparent at once to those skilled in this art that the pipe structure shown in section in Fig. 7 has been made by placing the two pipes, properly heated, into the die and letting the male die perform its stroke.

The two pipes, now connected by the common flat length 10, are next again heated, especially over the portion from point 2 toward the right, and are then placed into the position in the female die indicated in Fig. 8, whereupon the male die again makes a complete stroke with the resulting pipe structure as shown in this Fig. 8. During this second stroke the pipes have been split open farther, the portions adjacent to the slit have been opened up and welded to each other, the crotch now being located at 2′. The two pipes are now again removed from the die and heated to a welding heat, particularly over the space to the right of 2', then placed into the position indicated in Fig. 9 and again operated on by the die 9. This produces the pipe structure as shown in section in this Fig. 9.

Obviously, this process can be extended until we obtain any needed length from end 1 to the crotch 2. To adapt this structure to the use mentioned above, it will next be desirable to swage down the flat portion into the circular form as shown at 7, Figs. 3 and 10. This can be done in any preferred manner. In the past a structure such as illustrated in Fig. 3 could be made only by welding or safe-ending a portion to the united pipes, the weld occurring approximately at the point 11. By my method this unsatisfactory and expensive safe-ending is entirely done away with. If the structure is to be used for superheating and connected to a header such as 6, it may be directly rolled or expanded into the opening 12 or may be shaped at this extremity into the well-known form shown at 13 in Fig. 10 and secured to the header by means of a clamp 14.

What I claim is:

1. The method of making a structure such as described which comprises the steps of heating two pipe ends, slitting the wall of each longitudinally for a distance from the end, pressing the portions adjacent to the slits outwardly, forcing the edges of the said portions of one against corresponding edges of the other thereby welding them together, heating said pipes again over portions adjacent to the inner end of said weld, and slitting, pressing outwardly portions adjacent to the slits, and welding the edges of said portions for an additional distance.

2. The method of making a structure such as described which comprises the steps of heating two pipe ends, slitting the wall of each longitudinally for a distance from the end, pressing the portions adjacent to the slits outwardly, forcing the edges of the said portions of one against corresponding edges of the other thereby welding them together, heating said pipes again over portions adjacent to the inner end of said weld, and slitting, pressing outwardly portions adjacent to the slits, and welding the edges of said portions to each other and heating, slitting, pressing outward portions adjacent to the then inner end of said weld and welding the edges together for a third distance.

3. In the method of making a structure such as described which comprises the steps of heating two pipe ends, slitting the wall of each longitudinally for a distance from the end, spreading the portions adjacent to the slits outward, forcing the edges of the said portions of one against corresponding edges of the other, thereby welding them together; the improvement which consists in performing the slitting, spreading, and welding in a plurality of stages, each stage including a reheating over the area to be operated on during said stage, whereby the two pipes may be united for a relatively long distance.

4. In the method of making a structure such as described which comprises the steps of heating two pipe ends, slitting the wall of each longitudinally for a distance from the end, spreading the portions adjacent to the slits outward, forcing the edges of the said portions of one against corresponding edges of the other, thereby welding them together; the improvement which consists in performing the slitting, spreading, and welding in a plurality of stages, the structure being reheated between stages, each stage including a reheating over the area to be operated on during said stage, whereby the two pipes may be united for a relatively long distance.

5. The method of making a structure such as described which comprises the steps of heating two pipe ends, slitting the wall of each longitudinally for a distance from the end, spreading the portions adjacent to the slits outward, forcing the edges of the said portions of one against corresponding portions of the other, thereby welding them together; the improvement which consists in performing the slitting, spreading, and welding in a plurality of stages, the structure being reheated between stages over the areas to be operated on, whereby the two pipes may be united for a relatively long distance, and thereafter swaging down the resulting flat portion to circular shape for a part of its length.

BENJAMIN BROIDO.